March 3, 1959  H. J. WALTER  2,875,628
VARIABLE GEAR
Filed July 23, 1956
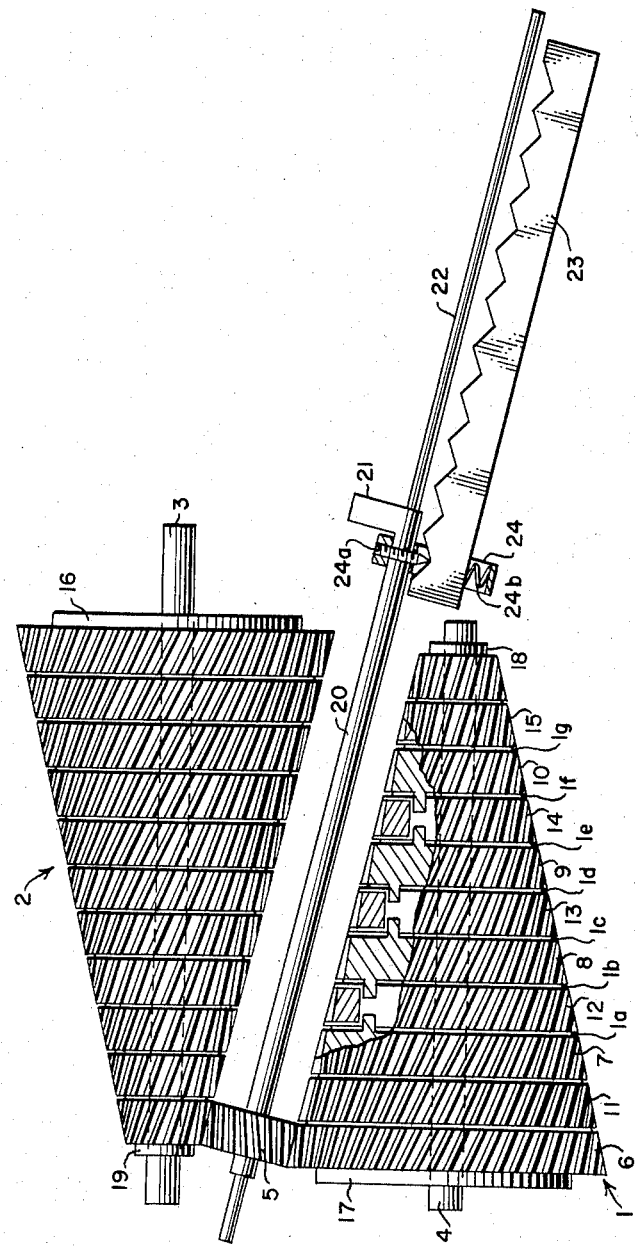
INVENTOR
Hermine Johannes Walter

United States Patent Office 2,875,628
Patented Mar. 3, 1959

2,875,628

VARIABLE GEAR

Hermine Johanna Walter, Huntsville, Ala.

Application July 23, 1956, Serial No. 599,642

1 Claim. (Cl. 74—349)

My invention relates to a variable speed transmission, by which it is possible to transform intermittently or continuously rotational power into others of constant torque but variable angular velocity, especially suitable for heavy duty gearing. Further details and advantages may be seen from the following description.

The drawing shows a preferred embodiment of the present invention.

The essential features of my invention are represented in the attached drawing. However I wish to point out, that said drawing is by no means restrictive to the scope of my invention but only given by way of example. Referring to the drawing, power is transmitted via a driving shaft 3. A conically shaped set of gears 2 is mounted on said shaft 3. There is another identical conically shaped set of gears 1, mounted on the parallel shaft 4. Rotation is transmitted from set 2 to set 1 by means of a transmission gear 5, whereby said transmission gear can freely rotate about hollow shaft 20, which is guided in central position by rod 22. Transmission wheel 5 together with shaft 20 can be shifted axially and stepwise by handle 21, which may be replaced by a servo motor. In addition to this there is provided a pin or tooth 24a, fixed inside a frame 24 by means of a spring 24b. Frame 24 is rigidly mounted on the longitudinally extended part of shaft 20. Pin 24a meshes with any of the equidistant grooves of positioning rack 23. Said conically shaped sets of gears 1 and 2 as well as transmission wheel 5 are preferably made of the twisted or helical type, in order to facilitate meshing when shifting. During shifting the transmission wheel 5 meshes simultaneously with four geared segments of 1 and 2. In order to prevent any trouble that might result therefrom in the event all gears were rigidly fixed on their shafts, the sets 1 and 2 are constructed in a special manner as indicated by a sectional view of set 1. According to this the gear segments 6, 7, 8, 9 and 10 are rigidly keyed onto shaft 4. Between them are interposed other gear segments 11, 12, 13, 14 and 15, which are not rigidly connected to said shaft 4. However they are held in position by extending parts of the adjacent segments 6 to 10. In addition to this all geared segments are pressed together so that the segments 11 to 15 can rotate with a speed different from that of both adjacent segments 6 to 10, however with friction. Said friction can be controlled or especially increased by interposing layers of frictional linings 1a, 1b, 1c, 1d, 1e, 1f and 1g between all segments. Said friction can widely be varied by tightening clamps 17 and 18, pressing against 1. The other conical set 2 is constructed in quite the same manner. That means it consists of several gear segments, fixed rigidly on shaft 3. Between them there are other gear segments not rigidly fixed on 3. These are held in position by extending parts of the adjacent gear segments. All segments are pressed together by clamps 16 and 19. Frictional faces are provided between any two segments of set 2 in quite the same manner as in set 1.

Assuming wheel 5 meshes simultaneously with segments 9 and 14 together with the corresponding two opposite segments, belonging to set 2, then all four segments will have the same circumferential velocity but different angular velocities. This however is harmless since 9 and 14 are connected to each other by friction only. The same holds for the two opposite gear segments in set 2. In the next step of shifting wheel 5 will mesh only with one not rigidly fixed segment of sets 1 and 2 each. It is true that these geared segments are not in an immediate contact to shafts 3 and 4. However they still transmit power from shaft 3 to shaft 4 by friction. And this amount of mediately transmitted power is increased as clamps 16, 19, 17 and 18 are tightened against set 2 and 1 respectively. On the other hand said friction should not be chosen too great in order to prevent unnecessarily great overheating of segments and linings. When shifting of wheel 5 is further continued, it will now mesh with 14 and 10 and the two segments opposite and the conditions are again quite the same as described above with 9 and 14.

When finally wheel 5 is meshing only with 10 and the opposite gear segment on shaft 3, power is transmitted via rigidly keyed gears only corresponding to a stable position of 24 on positioning rack 23. Be it mentioned that all the above described mediate positions are generally of short duration, since they do not correspond to stable positions of 23. Consequently frictional heat, generated during shifting, is completely negligible. The same holds for changes of power transmission during said mediate positions. In addition to this said changes are completely levelled in consequence of the momentum of inertia of the total assembly.

What I claim is:

A variable speed transmission comprising a driving shaft, a driven shaft, two conically shaped sets of gears with gradually increased diameters and numbers of equidistant teeth and a single interposed spur gear, wherein one set is mounted on one shaft driven by the driving shaft, and the other set is mounted on a parallel shaft driven by the spur gear regularly meshing with opposite gears in each set, said spur gear being axially and stepwise shiftable in a controlled manner. wherein said parallel shaft constitutes the finally driven shaft, said conical sets being assembled in such a manner that between any two normal gear segments keyed rigidly to the shaft, there are interposed gear segments not rigidly fixed to the shaft and rotationally driven by frictional faces on said gear segments which are maintained in frictional engagement with the faces of adjacent normal gear elements by clamps at the ends of each set of gears.

References Cited in the file of this patent

UNITED STATES PATENTS

| | | |
|---|---|---|
| 1,169,618 | Compton | Jan. 25, 1916 |
| 2,128,413 | Hejduck et al | Aug. 30, 1938 |
| 2,161,765 | Orbeck | June 6, 1939 |
| 2,390,240 | De Lancey | Dec. 4, 1945 |
| 2,514,158 | Hussain | July 4, 1950 |
| 2,750,812 | Mirone | June 19, 1956 |

FOREIGN PATENTS

| | | |
|---|---|---|
| 6,639 | Great Britain | Aug. 8, 1907 |
| 450,488 | Great Britain | July 20, 1936 |
| 638,600 | France | Feb. 21, 1928 |